March 1, 1932.  P. J. McMANAMAN  1,847,407
ELECTRIC SWITCH
Filed April 23, 1930   2 Sheets-Sheet 1

INVENTOR
PATRICK J. McMANAMAN
BY
John A. Bronnhardt
ATTORNEY

March 1, 1932.  P. J. McMANAMAN  1,847,407
ELECTRIC SWITCH
Filed April 23, 1930  2 Sheets-Sheet 2
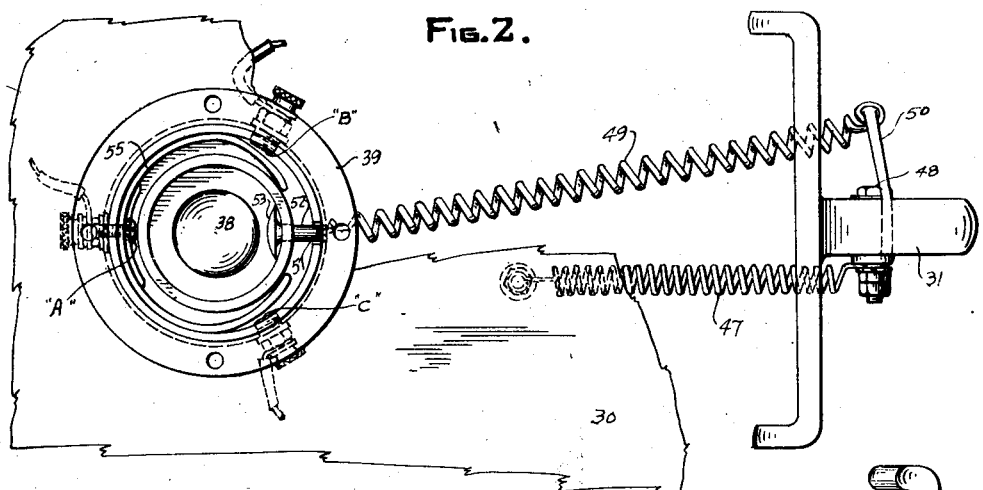
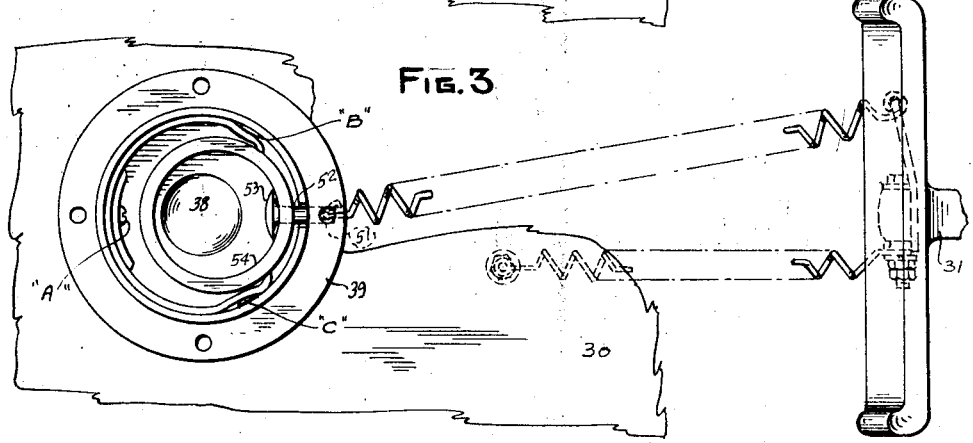
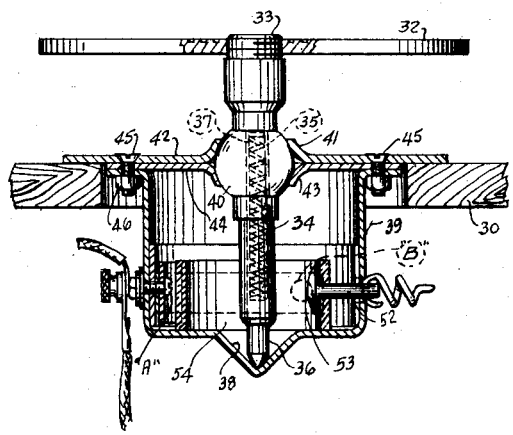
*INVENTOR*
PATRICK J. McMANAMAN
BY John A. Brummhardt
*ATTORNEY*

Patented Mar. 1, 1932

1,847,407

UNITED STATES PATENT OFFICE

PATRICK J. McMANAMAN, OF CLEVELAND, OHIO

ELECTRIC SWITCH

Application filed April 23, 1930. Serial No. 446,509.

This invention relates to electric switches, and is particularly useful as a foot switch to control stop and direction signals for automobiles.

The object of the invention is to provide an improved pedal switch which can be operated by the brake lever and also independently thereof, the latter operation being effected by tilting the foot of the driver to selectively close circuits connected to direction signals. In its latter aspect the device embodies a plurality of pairs of circuits, a tilting or universally movable lever on which the pedal is mounted and by the movement of which any selected pair of contacts can be closed, to light the corresponding signal.

One form of the invention is shown in the accompanying drawings, in which:

Fig. 2 is a plan view with the plates removed and showing the switch in neutral position.

Fig. 3 is the same as Fig. 2 except that the switch is shown making contact with points B and C which throws on all lights at once.

Fig. 4 is a section taken on line 4—4 of Fig. 1, showing the switch in neutral position.

Figure 1:
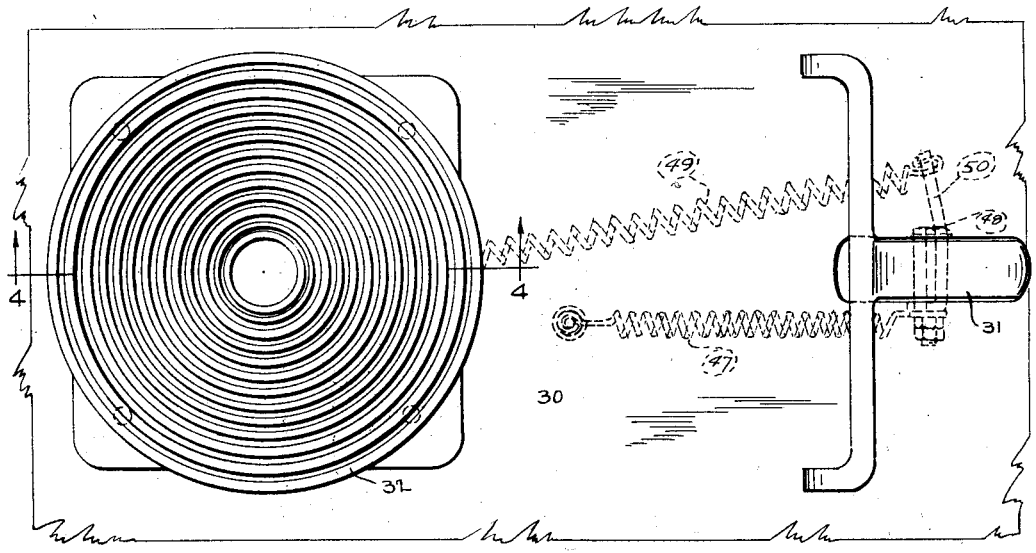
Fig. 1 is a top plan view of the foot brake and signal switch.

Referring to the drawings: 30 is the floor of the machine beneath which the foot brake lever 31 is mounted. Adjacent to, and slightly forward of the lever 31 is the switch pedal which consists of a corrugated foot plate 32, screwed on the threaded end 33 of the shifting stem 34. The said stem is hollow as at 35 into which a hollow pin 36 is fitted over the compression spring 37, the pin 36 being closed at the lower end and slightly tapered. When in the neutral position the tapered end of the pin 36 rests in the depression 38 of the bottom of the switch box 39. The ball portion 40 of the shifting stem 34 pivots in all directions between the upturned flange 41 of the upper plate 42 and the downturned flange 43 of the lower plate 44, and the lower plate 44 and the switch box 39 are fastened to the upper plate 42 by bolts 45 and nuts 46. The upper plate 42 rests on the top of the floor board 30 and is bolted in place. A spring 47 is attached to the under side of the floor board 30 at one end, the other being attached to the foot brake 31 by bolt 48. A spring 49 is attached to the bent plate 50 which is also attached to the foot brake 31 by the bolt 48, the other end of spring 49 being fastened through aperture 51 in the pin 52 which protrudes through the wall of the switch box 39, the head 53 of the pin 52 being held in position against the inner wall of a fibre ring 54. The depression of the foot lever expands the springs 47 and 49 drawing the fibre ring 54 forward against the metal contact spring 55 which thereby contact at each end with the contact points B and C. So when the brake is applied the lamps (not shown) controlled by the contacts B and C are lit.

Figure 5:
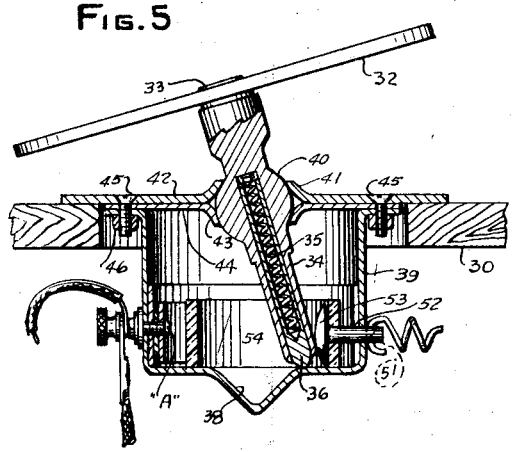
Fig. 5 is a section the same as Fig. 4 showing the same contacts as shown in Fig. 3.
Figure 6:
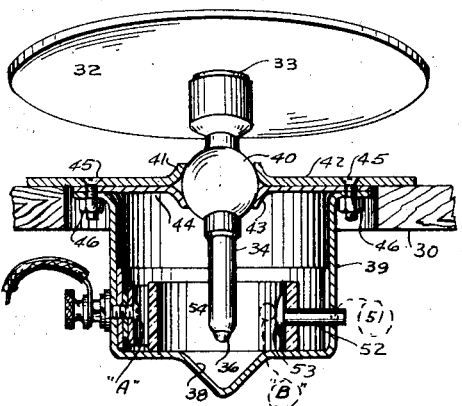
Fig. 6 is the same as the above except that the pedal is tipped to the left which makes the contact for the left hand lights only and signifies a left turn.
Figure 7:
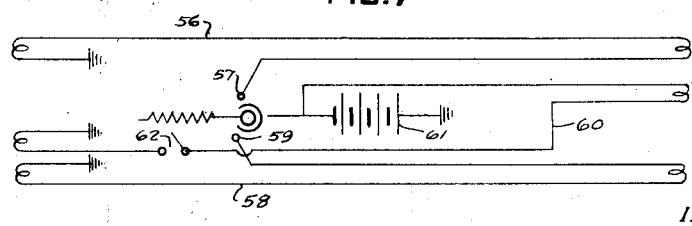
Fig. 7 is a wiring diagram for the invention.

The shifting of the pedal 33 to the position shown in Fig. 5 swings the tilting stem 34 up out of the depression 38 in the switch box 39 and against the head 53 of the pin 52 thus closing the same contacts as before described. By shifting the pedal 33 to the left, the stem 34 also slips out of the depression 38 and presses against the inner wall of the fibre ring 54 on the right side thus pressing back the fibre ring until the left end of the contact spring 55 makes contact with the point B thus lighting the left hand signal lights only. By shifting to the right the operation is reversed and the right hand signal lights only are lighted by contact C.

The left hand signal lights are connected by the conductors 56 and terminal 57, while conductors 58 connect the right hand signal lights and the terminal 59. The center lights of both devices are connected together by the conductors 60 and to the battery 61 and to a dash board switch 62, the floor switch described being used for the right and left hand lights.

The foot plate 32, having universal movement by reason of its ball and socket mounting, may be swung either way by tilting the foot to close contacts B or C selectively and thus light either right or left hand tail or signal lights, or swung forwardly when the brake is applied, to light both lamps. This provides an easy and convenient means for controlling the lamps, leaving the hands of the driver free for other purposes.

I claim:

1. A switch comprising a casing, a pivoted pedal and its stem having tilting movements in said casing in various directions at angles to each other, pairs of contacts arranged around the outer wall of the casing, and means actuated by the tilting of the pedal to selectively close said contacts, said means including a loose insulating ring shiftable in the casing.

2. A switch as in claim 1, said freely shiftable ring of insulating material being spaced from and extending around the stem and arranged to press said contact members together.

3. A switch comprising a casing, a shiftable ring of insulating material loosely mounted and slidable in various directions on the bottom of said casing, a plurality of pairs of contacts arranged around said ring, and means to shift said ring laterally in various directions to press selected contacts together.

4. A switch as in claim 3, said means including a pedal actuated lever movable in various directions to shift the ring accordingly.

5. A switch as in claim 3, in combination with a brake lever connected to said ring to also shift the same.

6. In a switch, the combination of a casing having a depression in the bottom, and a plurality of pairs of contacts around the same, an operating lever having a ball joint with the top of the casing and a spring pin at its lower end engaging in said depression, said lever being tiltable in various directions, and a shifting ring extending around said depression and between the lever and the contacts and actuated by tilting the lever to close selected pairs of contacts.

In testimony whereof, I do affix my signature.

PATRICK J. McMANAMAN.